United States Patent
Lee et al.

(10) Patent No.: US 11,086,584 B2
(45) Date of Patent: Aug. 10, 2021

(54) ELECTRONIC DEVICE, SYSTEM OF ELECTRONIC DEVICE, AND SYSTEM OPERATING METHOD OF ELECTRONIC DEVICE

(71) Applicant: Samsung Display Co., Ltd., Yongin-si (KR)

(72) Inventors: Hyoung Cheol Lee, Yongin-si (KR); Dae Won Kim, Yongin-si (KR); Young Seok Kim, Yongin-si (KR); Kee Hyun Nam, Yongin-si (KR); Ho Jung Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/815,866

(22) Filed: Mar. 11, 2020

(65) Prior Publication Data
US 2020/0293262 A1    Sep. 17, 2020

(30) Foreign Application Priority Data

Mar. 12, 2019   (KR) ...................... 10-2019-0028373

(51) Int. Cl.
| | |
|---|---|
| *G06F 3/14* | (2006.01) |
| *G06F 1/16* | (2006.01) |
| *G01S 11/02* | (2010.01) |

(52) U.S. Cl.
CPC ............ *G06F 3/1454* (2013.01); *G01S 11/02* (2013.01); *G06F 1/1652* (2013.01)

(58) Field of Classification Search
CPC ....... G06F 3/1454; G06F 1/1652; G01S 11/02
See application file for complete search history.

(56) References Cited

U.S. PATENT DOCUMENTS

| | | |
|---|---|---|
| 8,971,809 B2 | 3/2015 | Lee |
| 9,720,639 B1 | 8/2017 | Morgan |
| 10,009,933 B2 | 6/2018 | Morgan |
| 10,114,476 B2 | 10/2018 | Seo et al. |
| 10,203,726 B2 | 2/2019 | Rho et al. |

(Continued)

FOREIGN PATENT DOCUMENTS

| | | |
|---|---|---|
| KR | 10-1179912 B1 | 9/2012 |
| KR | 10-2016-0108732 A | 9/2016 |

(Continued)

*Primary Examiner* — Jeffery A Brier
(74) *Attorney, Agent, or Firm* — Lewis Roca Rothgerber Christie LLP

(57) ABSTRACT

An electronic device includes a communication unit configured to receive a plurality of image signals from a plurality of other electronic devices, a display unit including display regions including at least a first display region and a second display region, and a controller configured to control the display unit to display a first image signal received from a first other electronic device of the plurality of the other electronic devices in the first display region as an image and display a second image signal received from the second other electronic device of the plurality of other electronic devices in the second display region as an image, wherein the first display region and the second display region are determined according to respective distances between the plurality of other electronic devices and each of the plurality of display regions.

19 Claims, 8 Drawing Sheets

(56) References Cited

U.S. PATENT DOCUMENTS

| | | | | |
|---|---|---|---|---|
| 2012/0242571 A1* | 9/2012 | Takamura | ................ | G09G 5/36 |
| | | | | 345/156 |
| 2014/0129948 A1* | 5/2014 | Jones | ..................... | G06F 3/048 |
| | | | | 715/733 |
| 2015/0002550 A1* | 1/2015 | Liu | ....................... | G06F 3/1454 |
| | | | | 345/660 |
| 2015/0199165 A1* | 7/2015 | Chopde | ................ | G06F 3/1454 |
| | | | | 345/2.2 |
| 2020/0077138 A1* | 3/2020 | Sawyer | .............. | H04N 21/4126 |

FOREIGN PATENT DOCUMENTS

| | | |
|---|---|---|
| KR | 10-1777099 B1 | 9/2017 |
| KR | 10-2018-0036903 A | 4/2018 |
| KR | 10-1888448 B1 | 8/2018 |

\* cited by examiner

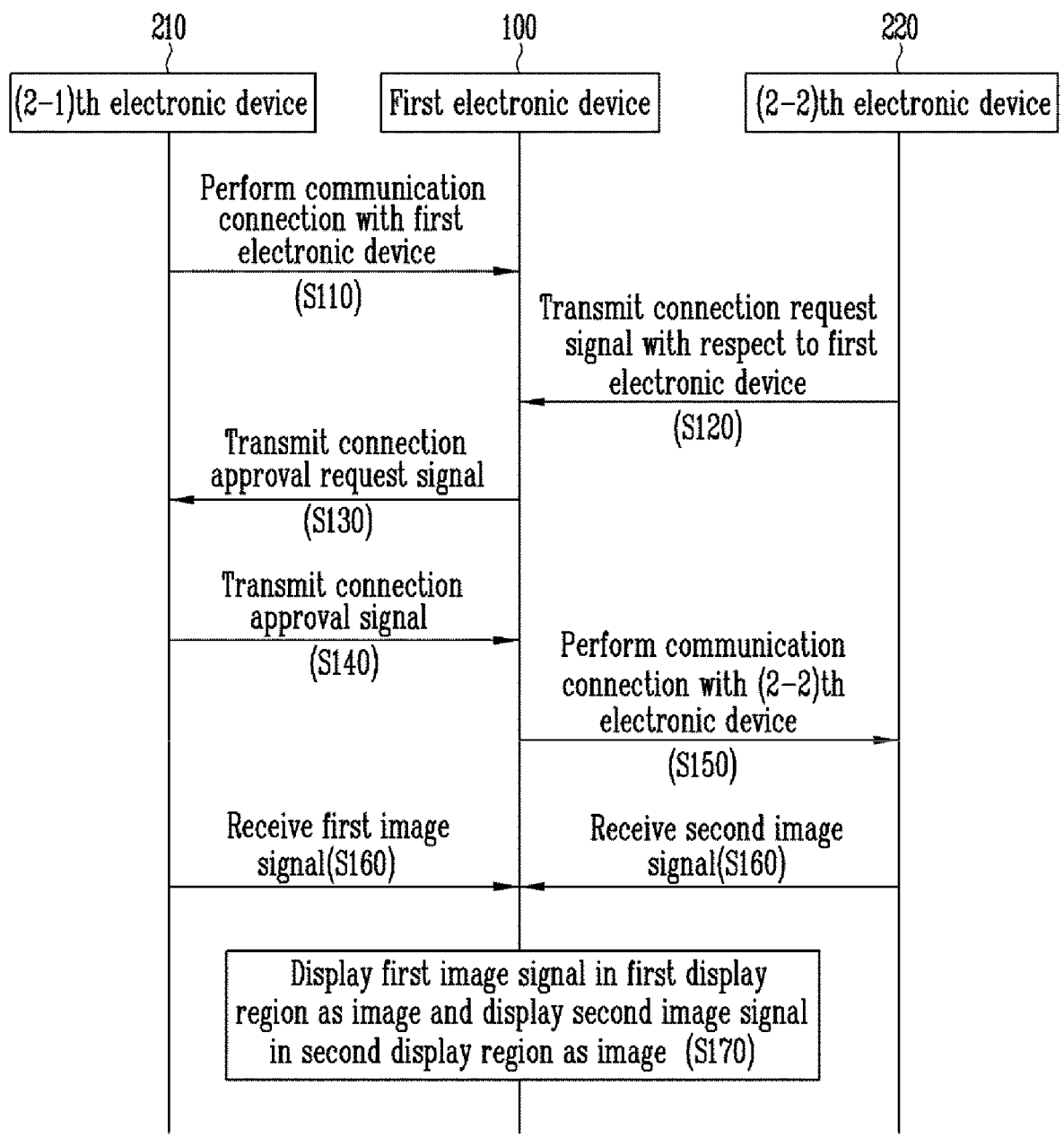

ELECTRONIC DEVICE, SYSTEM OF ELECTRONIC DEVICE, AND SYSTEM OPERATING METHOD OF ELECTRONIC DEVICE

CROSS-REFERENCE TO RELATED APPLICATION

This application claims priority to and the benefit of Korean Patent Application No. 10-2019-0028373 filed in the Korean Intellectual Property Office on Mar. 12, 2019, the entire contents of which are incorporated herein by reference.

BACKGROUND

1. Field

Embodiments of the present disclosure relate to an electronic device, a system of the electronic device, and a system operating method of the electronic device.

2. Description of the Related Art

As society has entered in earnest upon an information age, the field of electronic devices providing various functions using an electrical information signal display devices has advanced rapidly. Electronic devices are not confined only to one electronic device, but various electronic devices may transmit information to each other through wireless/wired communication and may interact with each other.

In addition, recently, an electronic device equipped with a flexible display panel has been developed. Unlike a flat panel, such a display panel may be folded or rolled like paper and may be folded together utilizing a folded region. A display panel, of which a shape is variously changeable, may be carried without (or substantially without) regard to the existing screen size, thereby improving user convenience.

SUMMARY

Embodiments of the present disclosure provide an electronic device in which a first electronic device including a plurality of display regions are configured to display image signals received from a plurality of second electronic devices as images in a display region of the plurality of regions, which is determined based on a respective distance between each of the plurality of second electronic devices and each of the plurality of display regions, a system of the electronic device, and a system operating method of the electronic device.

Another embodiment of the present disclosure provides an electronic device in which a first electronic device is foldable according to at least one selected from an in-folding method and an out-folding method in a region between display regions, a system of the electronic device, and a system operating method of the electronic device.

Another embodiment of the present disclosure provides an electronic device in which, when a first electronic device is coupled to a second electronic device through communication, the first electronic device may be coupled to the second electronic device by an approval of one of second electronic devices which are already coupled, a system of the electronic device, and a system operating method of the electronic device.

It should be understood, however, that the present disclosure may be not to be limited by the foregoing, and may be variously expanded without departing from the spirit and scope of the present disclosure.

An electronic device according to an exemplary embodiment of the present disclosure includes a communication unit configured to receive a plurality of image signals from a plurality of other electronic devices; a display unit including display regions including at least a first display region and a second display region; and a controller configured to control the display unit to display a first image signal received from a first other electronic device of the plurality of the other electronic devices in the first display region as an image and display a second image signal received from the second other electronic device of the plurality of other electronic devices in the second display region as an image, wherein the first display region and the second display region are determined according to respective distances between the plurality of other electronic devices and each of the display regions.

A distance between the first display region and the first other electronic device may be less than a respective distance between each of the remaining display regions except for the first display region and the first other electronic device, and a distance between the second display region and the second other electronic device may be less than a respective distance between each of the remaining display regions except for the second display region and the second other electronic device.

The communication unit may be configured to receive distance data on a respective distance between the first other electronic device and each of the display regions from the first other electronic device and may be configured to receive distance data on a respective distance between the second other electronic device and each of the display regions from the second other electronic device.

The electronic device may further include a sensing unit configured to measure a respective distance between each of the plurality of other electronic devices and each of the display regions.

The communication unit may include antennas in the display regions, the antennas being configured to receive wireless signals from the plurality of other electronic devices, and the sensing unit may be configured to measure the respective distance between each of the plurality of other electronic devices and each of the display regions based on the wireless signal received by each of the antennas.

The display unit may be folded according to at least one selected from an in-folding method and an out-folding method at a boundary between the display regions.

The communication unit may be configured to communicate with the plurality of other electronic devices in response to the folding of the display unit.

The electronic device may be configured to be turned on or off in response to the folding of the display unit.

When the communication unit receives the second image signal from the second other electronic device, the communication unit may receive a connection request signal with respect to the electronic device from another other electronic device, may transmit a connection approval request signal to the first other electronic device having an approval right in response to the connection request signal, and may perform a communication connection with the another other electronic device only when the connection approval signal is received from the first other electronic device.

A number of the plurality of other electronic devices may be a number equal to or less than a number of the display regions.

The electronic device may further include a power supply configured to supply power to the electronic device, wherein at least one selected from the power supply and the controller is physically separable from other components of the electronic device.

The controller may be configured to intactly supply the plurality of image signals received by the communication unit to the display unit, and the plurality of image signals may be image data in which image processing is performed.

A system operating method of an electronic device according to an exemplary embodiment includes receiving, by an electronic device including display regions including at least a first display region and a second display region, a plurality of image signals from a plurality of other electronic devices; determining, by the electronic device, display regions in which a first image signal received from a first other electronic device of the plurality of other electronic devices and a second image signal received from a second other electronic device of the plurality of other electronic devices are displayed as images based on respective distances between the plurality of other electronic devices and each of the plurality of display regions; and displaying the first image signal in the first display region as the image and displaying the second image signal in the second display region as the image.

The determining of the display regions in which the first image signal and the second image signal are displayed as the images may include determining a display region that is closest to one of the plurality of other electronic devices among the plurality of other electronic devices as to be a display region in which an image signal received from the one of the plurality of other electronic devices is displayed as an image.

A distance between the first display region and the first other electronic device may be less than a respective distance between each of the remaining display regions except for the first display region and the first other electronic device, and a distance between the second display region and the second other electronic device may be less than a respective distance between each of the remaining display regions except for the second display region and the second other electronic device.

The receiving of the plurality of image signals from the plurality of other electronic devices may include receiving, by the electronic device, distance data on a respective distance between the first other electronic device and each of the display regions from the first other electronic device and distance data on a respective distance between the second other electronic device and each of the display regions from the second other electronic device.

The receiving of the plurality of image signals from the plurality of other electronic devices may further include generating, by the electronic device, distance data by measuring a respective distance between each of the plurality of other electronic devices and each of the display regions based on each of wireless signals received by each of antennas by using the antennas in the display regions and receiving the wireless signals from the plurality of other electronic devices.

The system operating method may further include, prior to receiving, by the electronic device, the plurality of image signals from the plurality of other electronic devices, performing, by the electronic device, a communication connection with the first other electronic device in response to a folding operation between display regions, receiving, by the electronic device, a connection request signal from the second other electronic device, transmitting, by the electronic device, a connection approval request signal to the first other electronic device having an approval right in response to the reception of the connection request signal, and when the connection approval signal is received from the first other electronic device, performing, by the electronic device, a communication connection with the second other electronic device.

A system of an electronic device according to an exemplary embodiment includes a first electronic device including display regions which have at least a first display region and a second display region; and a plurality of second electronic devices communicating with the first electronic device, wherein a $(2\text{-}1)^{th}$ electronic device of the plurality of second electronic devices is configured to transmit a first image signal to the first electronic device, a $(2\text{-}2)^{th}$ electronic device of the plurality of second electronic devices is configured to transmit a second image signal to the first electronic device, the first electronic device is configured to display the first image signal in the first display region as an image and the second image signal in the second display region as an image, and the first display region and the second display region are determined based on respective distances between each of the $(2\text{-}1)^{th}$ electronic device and the $(2\text{-}2)^{th}$ electronic device and each of the display regions.

Other detailed matters of the exemplary embodiments are included in the detailed description and the drawings.

BRIEF DESCRIPTION OF THE DRAWINGS

The accompanying drawings, together with the specification, illustrate embodiments of the subject matter of the present disclosure, and, together with the description, serve to explain principles of embodiments of the subject matter of the present disclosure.

FIG. 5 is a flowchart of a system operating method of an electronic device according to an exemplary embodiment of the present disclosure.

DETAILED DESCRIPTION

Figure 1:
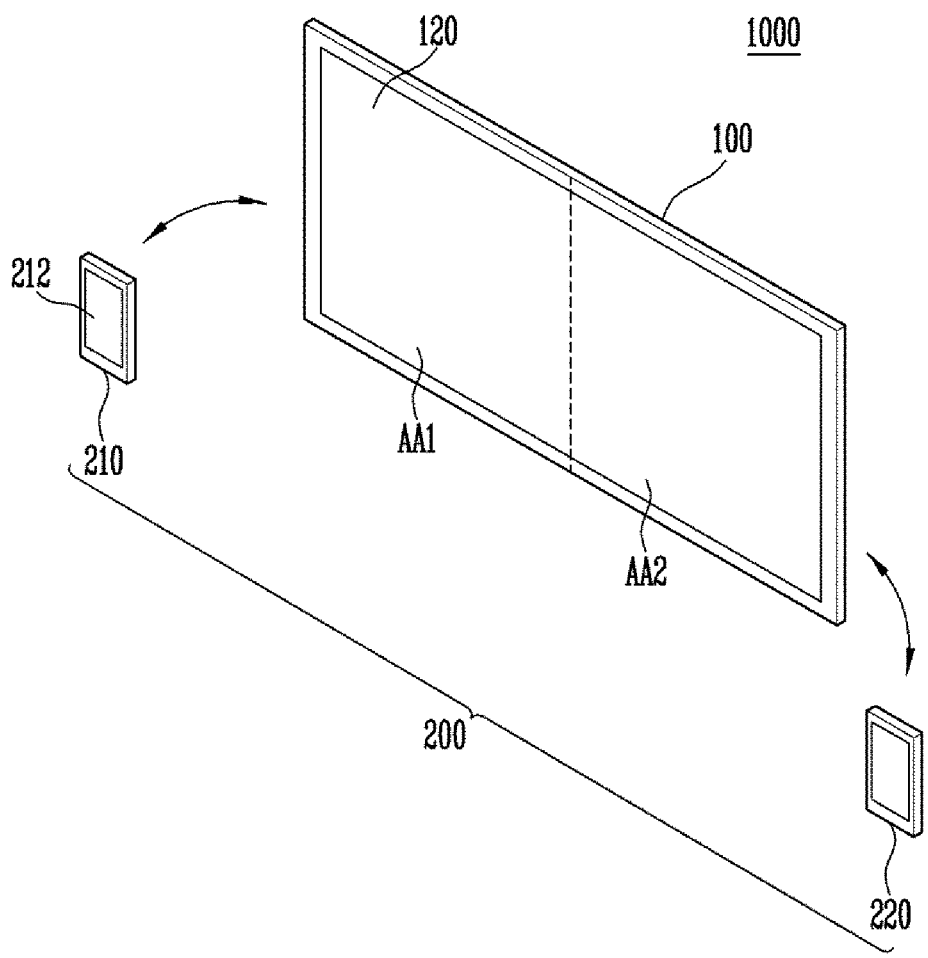
FIG. 1 is a schematic diagram illustrating an electronic device, a system of the electronic device, and a system operation method of the electronic device according to an exemplary embodiment of the present disclosure.

Features of embodiments of the present disclosure, and methods for accomplishing the same, will be more clearly understood from exemplary embodiments described below with reference to the accompanying drawings. However, the subject matter of the present disclosure is not limited to the following exemplary embodiments but may be implemented in various different forms. The exemplary embodiments are provided only to complete the disclosure of the subject matter of the present disclosure and to fully provide a person having ordinary skill in the art to which the present disclosure pertains with the category of the present disclosure, and the present disclosure will be defined by the appended claims, and equivalents thereof.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the present specification. Further, in the following description, a detailed explanation of known related technologies may be omitted to avoid unnecessarily obscuring the subject matter of the present disclosure. The terms such as "including," "having," and "comprising," as used herein, are generally intended to allow other components to be added unless the terms are used with the term "only". Any references to the singular herein may also include the plural, unless expressly stated otherwise.

Components, as described herein, are interpreted to include an ordinary error range even if not expressly stated herein.

When the position relationship between two parts is described using terms such as "on," "above," "below," and "next," one or more parts may be positioned between the two parts unless the terms are used with the term "immediately" or "directly" (e.g., "directly on" or "immediately next to").

As used herein, a phrase "an element A on an element B" refers to that the element A may be directly on the element B and/or the element A may be indirectly on the element B via another element C.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the spirit and scope of the present disclosure.

Like reference numerals generally denote like elements throughout the present specification.

A size and thickness of each element illustrated in the drawings may be illustrated for convenience of description, and the present disclosure is not essentially limited to the size and the thickness of the illustrated element.

Respective characteristics of several exemplary embodiments of the present disclosure may be partially or entirely coupled or combined, and technically and variously coupled and driven enough for those skilled in the art to fully understand, and respective exemplary embodiments may be independently carried out, and implemented together according to an associated relation.

Hereinafter, exemplary embodiments of the present disclosure will be described in more detail with reference to the accompanying drawings.

Figure 2:
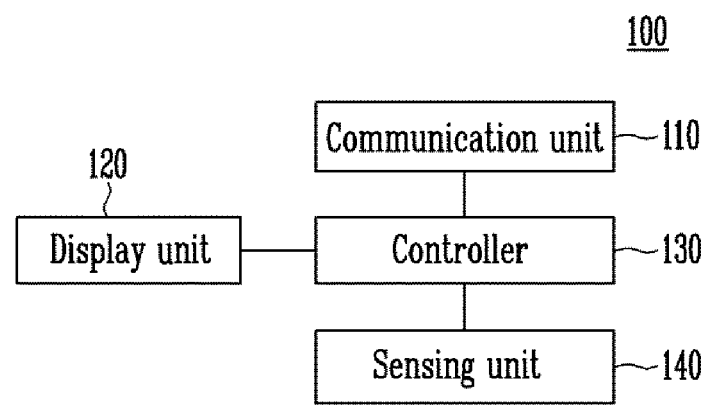
FIG. 2 is a block diagram illustrating a first electronic device according to the exemplary embodiment of the present disclosure.
Figure 3A:
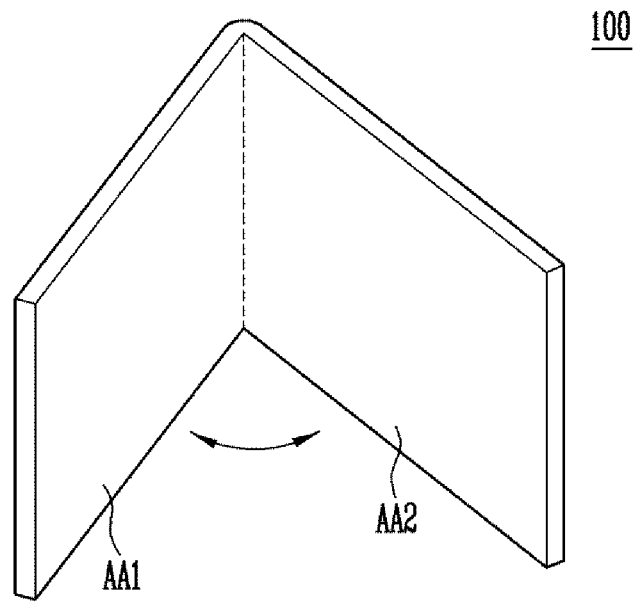
FIGS. 3A to 3C are diagrams illustrating the first electronic device according to the exemplary embodiment of the present disclosure.
Figure 3B:
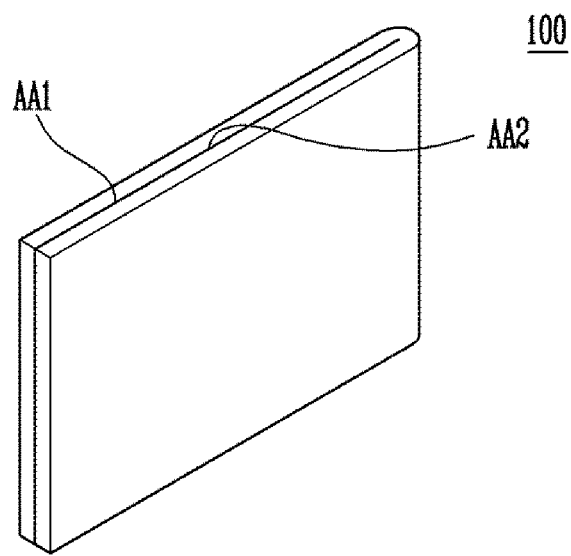
Figure 3C:
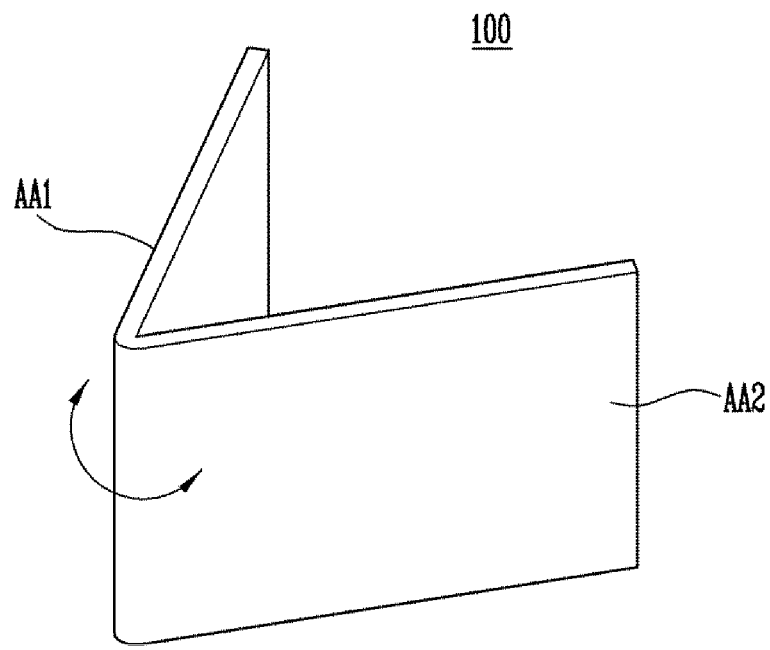
Figure 4:
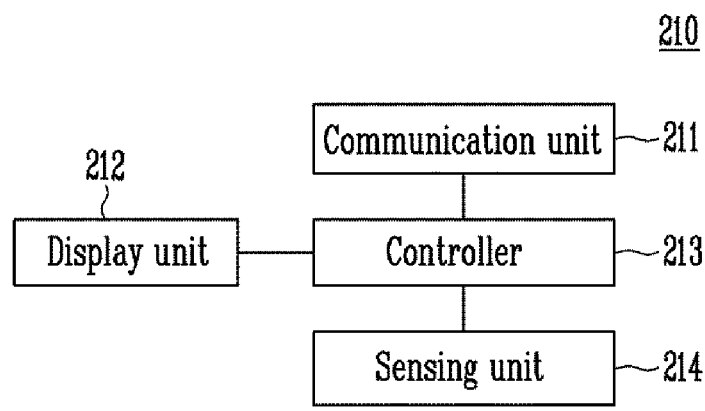
FIG. 4 is a block diagram illustrating a second electronic device according to the exemplary embodiment of the present disclosure.

FIG. 1 is a schematic diagram illustrating an electronic device, a system of the electronic device, and a system operation method of the electronic device according to an exemplary embodiment of the present disclosure. FIG. 2 is a block diagram illustrating a first electronic device according to the exemplary embodiment of the present disclosure. FIGS. 3A to 3C are diagrams illustrating the first electronic device according to the exemplary embodiment of the present disclosure. FIG. 4 is a block diagram illustrating a second electronic device according to the exemplary embodiment of the present disclosure.

Referring to FIGS. 1 to 4, a system 1000 of an electronic device includes a first electronic device 100 and a plurality of second electronic devices 200.

The first electronic device 100 is a device which includes a plurality of display regions (including at least a first display region AA1 and a second display region AA2) and displays image signals received from the plurality of second electronic devices 200 in the display regions (e.g., the first display region AA1 and the second display region AA2) as images. The first electronic device 100 may include a communication unit 110, a display unit 120, a controller 130, and a sensing unit 140.

The communication unit 110 of the first electronic device 100 is a component which allows the plurality of second electronic devices 200 and the first electronic device 100 to communicate with each other. The communication unit 110 may transmit and receive signals to and from communication units 211 of the plurality of second electronic devices 200 through wireless or wired communication and may receive the image signals from the plurality of second electronic devices 200. In some embodiments, the communication unit 110 may receive a communication connection request from the second electronic devices 200 adjacent to the first electronic device 100. For example, when the communication unit 110 receives a communication connection request from a $(2\text{-}1)^{th}$ electronic device 210 of the second electronic devices 200 and there is no second electronic device 200 coupled to the communication unit 110 through communication, the communication unit 110 may perform a communication connection with the $(2\text{-}1)^{th}$ electronic device 210. Next, the communication unit 110 may receive a communication connection request from a $(2\text{-}2)^{th}$ electronic device 220 of the second electronic devices 200. In this case, the communication unit 110 may transmit a communication connection approval request to the $(2\text{-}1)^{th}$ electronic device 210 having an approval right to approve a communication connection among the second electronic devices 200 (e.g., the $(2\text{-}1)^{th}$ electronic device 210 and the $(2\text{-}2)^{th}$ electronic device 220). Only when a communication connection approval signal is received from the $(2\text{-}1)^{th}$ electronic device 210, the communication unit 110 may perform a communicate connection with the $(2\text{-}2)^{th}$ electronic device 220. A communication connection process between the communication unit 110 and the second electronic devices 200 (e.g., the $(2\text{-}1)^{th}$ electronic device 210 and the $(2\text{-}2)^{th}$ electronic device 220) is not limited thereto, and the communication unit 110 and the second electronic devices 200 (e.g., the $(2\text{-}1)^{th}$ electronic device 210 and the $(2\text{-}2)^{th}$ electronic device 220) may be coupled through various suitable methods.

When the communication unit 110 uses wireless communication, the communication unit 110 may include a wireless internet module and a short-range communication module.

In some embodiments, the wireless internet module is a module which allows the first electronic device 100 to access a wireless internet. The wireless internet module may transmit and receive a wireless signal through a communication network according to wireless internet technologies. For example, the wireless internet technologies include wireless local area network (WLAN), wireless-fidelity (Wi- Fi), Wi-Fi direct, digital living network alliance (DLNA), wireless broadband (WiBro), world interoperability for microwave access (WiMAX), high speed downlink packet access (HSDPA), high speed uplink packet access (HSUPA), long term evolution (LTE), and LTE-advanced (LTE-A).

The short-range communication module may be for short-range communication and may support the short-range communication using at least one of Bluetooth™, radio frequency identification (RFID), infrared data association (IrDA), ultra wideband (UWB), ZigBee, near filed communication (NFC), Wi-Fi, Wi-Fi direct, and wireless universal serial bus (wireless USB) technologies. The short-range communication module may couple the first electronic device 100 and each of the plurality of second electronic devices 200 through wireless communication on a wireless area network.

The display unit 120 of the first electronic device 100 may include the plurality of display regions (e.g., the first display region AA1 and the second display region AA2). Referring to FIGS. 1 and 3A to 3C, the display unit 120 may include the first display region AA1 and the second display region AA2. The first display region AA1 and the second display region AA2 may be side by side of each other and may display different images.

The first electronic device 100 may be folded between the first display region AA1 and the second display region AA2. As shown in FIG. 1, the first electronic device 100 may not be folded and may be flattened such that the first display region AA1 and the second display region AA2 are on the same plane. As shown in FIG. 3A, the first electronic device 100 may be in-folded such that the first display region AA1 and the second display region AA2 face each other. An in-folded angle may be adjusted by a user.

As shown in FIG. 3B, the first display region AA1 and the second display region AA2 may come into contact with each other so as to face each other. In this case, the display regions of the first electronic device 100 may not be exposed to the outside. The first electronic device 100 may be completely in-folded, thereby improving portability thereof.

When the first electronic device 100 is completely folded such that the first display region AA1 and the second display region AA2 face each other as shown in FIG. 3B, the controller 130 of the first electronic device 100 may automatically turn off communication (turn power off and/or the like). For example, when the first electronic device 100 is folded, the controller 130 may cut off power to the communication unit 110 or release pairing with the second electronic device 200 to automatically cut off a communication connection between the communication unit 110 and the second electronic device 200 or to cut off entire power of the first electronic device 100. When the first electronic device 100 which is completely folded is unfolded again, the controller 130 may automatically turn on the communication of the first electronic device 100 (turn power off and/or the like). For example, when the first electronic device 100 which is completely folded is unfolded, the controller 130 may re-couple power to the communication unit 110 and control the communication unit 110 so as to be paired with the second electronic device 200. Thus, the communication unit 110 may search for a surrounding second electronic device 200 capable of performing short-range communication or may perform a communication connection with a set or specific electronic device of the second electronic devices 200 which is previously coupled through communication.

As shown in FIG. 3C, the first electronic device 100 in an unfolded state may be out-folded such that the first display region AA1 and the second display region AA2 face in opposite directions. An out-folded angle may be adjusted by a user. When the first electronic device 100 is completely out-folded, the first electronic device 100 may be completely folded such that the first display region AA1 and the second display region AA2 face in the opposite directions. The number of the display regions of the first electronic device 100 is not limited to two, and the first electronic device 100 may include three or more display regions. An exemplary embodiment in which the first electronic device 100 includes three display regions will be described in more detail with reference to FIGS. 7A and 7B below.

The sensing unit 140 of the first electronic device 100 is a component which senses a respective distance to at least one electronic device of the second electronic devices 200 coupled to each of the plurality of display regions through communication. For example, antennas of the communication unit 110 may be in the display regions (e.g., the first display region AA1 and the second display region AA2), and a wireless signal may be generated in the antenna. The wireless signal generated in the antenna may be transmitted to each of the plurality of second electronic devices 200, and each of the plurality of second electronic devices 200 may transmit a response signal in response to the wireless signal. The antennas installed in the display regions (e.g., the first display region AA1 and the second display region AA2) may receive the response signal. The sensing unit 140 may receive the response signals transmitted from the plurality of second electronic devices 200 from the communication unit 110 and may determine a relative distance between each of the second electronic devices 200 and each of the display regions (e.g., the first display region AA1 and the second display region AA2), respectively, using the response signal. For example, the sensing unit 140 may calculate a difference between a time at which the antenna in the first display region AA1 transmits the wireless signal to the second electronic devices 200 and a time at which the response signal is received from each of the second electronic devices 200. The sensing unit 140 may determine that the second electronic device 200 having such a small difference between the times is located relatively closer to the first display region AA1. Embodiments of the present disclosure are not limited to such a method, however, and the sensing unit 140 of the first electronic device 100 may measure a respective distance between each of the plurality of second electronic devices 200 and each of the plurality of display regions (e.g., the first display region AA1 and the second display region AA2) through various suitable methods. For example, the communication unit 110 may transmit a sound wave signal, an optical signal, and the like in addition to a wireless signal and may transmit time information physically reflected from the second electronic device 200 to the sensing unit 140. The sensing unit 140 may also measure a distance using the time information.

The controller 130 of the first electronic device 100 may control components of the first electronic device 100. For example, the controller 130 may control the display unit 120 to display a plurality of image signals received by the communication unit 110 in the display regions (e.g., the first display region AA1 and the second display region AA2) as images. Here, the image signal may be image data in which all image processing is performed on original image data. In some embodiments, the second electronic device 200 may generate second image data by performing image processing such as a luminance adjustment, a dimming adjustment, and a gradation adjustment on first image data, which is the original image data. The second electronic device 200 may transmit the second image data, in which image processing is performed, to the first electronic device 100 as an image signal. Therefore, the controller 130 of the first electronic device 100 may not perform separate image processing on the received image signal and may control the display unit 120 to display the image signal as an image. Accordingly, a size of the controller 130 may be minimized or reduced.

According to an exemplary embodiment, the controller 130 may display image signals received from the second electronic devices 200 in the display regions in order in which the second electronic devices 200 are coupled to the first electronic device 100 through communication. For example, when a communication connection is performed with the $(2-1)^{th}$ electronic device 210 of the second electronic device 200, the controller 130 may display an image signal received from the $(2-1)^{th}$ electronic device 210 in both of the display regions (e.g., the first display region AA1 and the second region AA2) as an image. In some embodiments, the image signal received from the $(2-1)^{th}$ electronic device 210 may be displayed as one image in both of the display regions (e.g., the first display region AA1 and the second display region AA2) or may be displayed in each of the display regions as a plurality of identical images. Next, when a communication connection is performed not only with the $(2-1)^{th}$ electronic device 210 but also with the $(2-2)^{th}$ electronic device 220, the controller 130 may display the image signal received from the $(2-1)^{th}$ electronic device 210 in one of the display regions (e.g., the first display region AA1 and the second display region AA2) and may display an image signal received from the $(2-2)^{th}$ electronic device 220 in the other of the display regions (e.g., the first display region AA1 and the second display region AA2).

In this case, the controller 130 may perform an operation of determining whether the image signal received from each of the second electronic devices 200 (e.g., the $(2-1)^{th}$ electronic device 210 and the $(2-2)^{th}$ electronic device 220) is displayed in any of the display regions (e.g., the first display region AA1 and the second display region AA2) as an image. For example, each of the second electronic devices 200 (e.g., the $(2-1)^{th}$ electronic device 210 and the $(2-2)^{th}$ electronic device 220) may receive a selection input from a user through a user interface, wherein the selection input is an input of selecting whether an image is displayed in any of the display regions (e.g., the first display region AA1 and the second display region AA2). The $(2-1)^{th}$ electronic device 210 may receive a selection input from the user through the user interface, wherein the selection input is an input of displaying the image signal of the $(2-1)^{th}$ electronic device 210 in the first display region AA1 as an image. The $(2-2)^{th}$ electronic device 220 may receive a selection input from the user through the user interface, wherein the selection input is an input of displaying the image signal of the $(2-2)^{th}$ electronic device 220 in the second display region AA2 as an image. Each of the second electronic devices 200 (e.g., the $(2-1)^{th}$ electronic device 210 and the $(2-2)^{th}$ electronic device 220) may transmit the selection input of the user received through the user interface to the first electronic device 100. The controller 130 of the first electronic device 100 may control the display unit 120 based on the received selection inputs of the user to display the image signal of the $(2-1)^{th}$ electronic device 210 in the first display region AA1 as the image and display the image signal of the $(2-2)^{th}$ electronic device 220 in the second display region AA2 as the image.

Alternatively, the controller 130 may determine a display region, in which each of a plurality of image signals is displayed, based on distance data received from the sensing unit 140 between each of the plurality of display regions (e.g., the first display region AA1 and the second display region AA2) and each of the plurality of second electronic devices 200. As described above, the sensing unit 140 may determine the relative distance between each of the display regions (e.g., the first display region AA1 and the second display region AA2) and each of the second electronic devices 200 (e.g., the $(2-1)^{th}$ electronic device 210 and the $(2-2)^{th}$ electronic device 220), respectively. For example, the sensing unit 140 may determine that the first display region AA1 is relatively closer to the $(2-1)^{th}$ electronic device 210 than to the $(2-2)^{th}$ electronic device 220 and may determine that the second display region AA2 is relatively closer to the $(2-2)^{th}$ electronic device 220 than to the $(2-1)^{th}$ electronic device 210. The sensing unit 140 may transmit the distance information to the controller 130 as distance data. The controller 130 may control the display unit 120 based on the distance data to display the image signal of the $(2-1)^{th}$ electronic device 210 closer to the first display region AA1 as the image and display the image signal of the $(2-2)^{th}$ electronic device 220 closer to the second display region AA2 as the image.

The first electronic device 100 may further include a power supply. The power supply may include a battery and may supply power to the first electronic device 100. The power supply may be charged in a wireless or wired manner.

In FIG. 2, it has been described that the first electronic device 100 includes the sensing unit 140, but the present disclosure is not limited thereto. The first electronic device 100 may not include the sensing unit 140. In this case, each of the plurality of second electronic devices 200 includes a sensing unit 214, and the sensing unit 214 of the second electronic device 200 may measure a respective distance between a corresponding electronic device of the second electronic devices 200 and the plurality of display regions (e.g., the first display region AA1 and the second display region AA2). The communication unit 110 of the first electronic device 100 may receive distance data measured by the second electronic device 200, the controller 130 of the first electronic device 100 may control the display unit 120 based on the received distance data to display a plurality of image signals in a set or specific region.

The plurality of second electronic devices 200 are electronic devices which transmit image signals to the first electronic device 100. The plurality of second electronic devices 200 may include the $(2-1)^{th}$ electronic device 210 and the $(2-2)^{th}$ electronic device 220. The $(2-1)^{th}$ electronic device 210 and the $(2-2)^{th}$ electronic device 220 may be independent devices and may be used by different users. The $(2-1)^{th}$ electronic device 210 of the plurality of second electronic devices 200 will be described. The $(2-1)^{th}$ electronic device 210 may include a communication unit 211, a display unit 212, a controller 213, and a sensing unit 214. The $(2-2)^{th}$ electronic device 220 may include the same components as the $(2-1)^{th}$ electronic device 210. The description of the $(2-1)^{th}$ electronic device 210 may also be applied to the $(2-2)^{th}$ electronic device 220.

The communication unit 211 of the $(2-1)^{th}$ electronic device 210 is a component which allows the $(2-1)^{th}$ electronic device 210 and the first electronic device 100 to communicate with each other. The communication unit 211 may transmit and receive signals to and from the first electronic device 100 through wireless or wired communication. For example, the communication unit 211 may transmit a communication connection request to the first electronic device 100 and may also be coupled to the first electronic device 100 through communication. When a communication connection is completed, the communication unit 211 may transmit a first image signal to the first electronic device 100. In this case, when the (2-1)$^{th}$ electronic device 210 includes the sensing unit 214, the communication unit 211 may transmit distance data on a distance to the first electronic device 100, wherein the distance is a respective distance between the (2-1)$^{th}$ electronic device 210 and each of the plurality of display regions (e.g., the first display region AA1 and the second display region AA2), which is measured by the sensing unit 214.

When the communication unit 211 uses wireless communication, the communication unit 110 may include a wireless internet module and a short-range communication module.

For example, the wireless internet module is a module which allows the first electronic device 100 to access a wireless internet. The wireless internet module may transmit and receive a wireless signal through a communication network according to wireless internet technologies. For example, the wireless internet technologies include WLAN, Wi-Fi, Wi-Fi direct, DLNA, WiBro, WiMAX, HSDPA, HSUPA, LTE, and LTE-A.

The short-range communication module may be for short-range communication and may support the short-range communication using at least one of Bluetooth™, RFID, IrDA, UWB, ZigBee, NFC, Wi-Fi, Wi-Fi direct, and wireless USB technologies. The short-range communication module may couple the first electronic device 100 and each of the plurality of second electronic devices 200 through wireless communication on a wireless area network.

The display unit 212 of the (2-1)$^{th}$ electronic device 210 is a component which displays an image. The display unit 212 may include a display region, and an image may be displayed in the display region. For example, the first image signal may be displayed as an image in the display region of the display unit 212. However, the present disclosure is not limited thereto, and other image signals different from the first image signal may be displayed as an image in the display region. The display unit 212 may not be an essential component and may be omitted if necessary. The sensing unit 214 of the (2-1)$^{th}$ electronic device 210 is a component which senses the respective distance between the (2-1)$^{th}$ electronic device 210 and each of the plurality of display regions (e.g., the first display region AA1 and the second display region AA2). For example, the communication unit 211 of the (2-1)$^{th}$ electronic device 210 may generate a wireless signal, and the wireless signal may be transmitted to the antennas to correspond to the display regions (e.g., the first display region AA1 and the second display region AA2) of the first electronic device 100. The communication unit 211 may receive response signals from the antennas. The sensing unit 214 may receive information on a time at which the wireless signal is generated and pieces of information on times at which the response signals are received, from the communication unit 211. The sensing unit 214 may measure respective distances between the (2-1)$^{th}$ electronic device 210 and the plurality of display regions (e.g., the first display region AA1 and the second display region AA2) using time differences between reception times of the received response signals and a transmission time of the wireless signal. The sensing unit 140 may transmit distance information on the measured distance to the controller 213. However, the present disclosure is not limited to such a method, and the sensing unit 214 of the (2-1)$^{th}$ electronic device 210 may measure a distance through various suitable methods.

In FIG. 4, it has been described that the (2-1)$^{th}$ electronic device 210 includes the sensing unit 214, but the present disclosure is not limited thereto. When the first electronic device 100 includes the sensing unit 140, the (2-1)$^{th}$ electronic device 210 may not include the sensing unit 214. In this case, the sensing unit 140 of the first electronic device 100 may measure the respective distance between the (2-1)$^{th}$ electronic device 210 and each of the plurality of display regions (e.g., the first display region AA1 and the second display region AA2).

The controller 213 of the (2-1)$^{th}$ electronic device 210 may control components of the (2-1)$^{th}$ electronic device 210. The controller 213 may control the communication unit 211 to transmit the first image signal and the distance data on the distance measured by the sensing unit 214 to the first electronic device 100.

In the present exemplary embodiment, it has been described that the plurality of second electronic devices 200 include only the (2-1)$^{th}$ electronic device 210 and the (2-2)$^{th}$ electronic device 220, but the present disclosure is not limited thereto. The plurality of second electronic devices 200 may include three or more second electronic devices 200. A case in which the plurality of second electronic devices 200 include three second electronic devices 200 will be exemplarily described in more detail below with reference to FIGS. 7A and 7B.

In various exemplary embodiments, the number of the plurality of second electronic devices 200 capable of being coupled to the first electronic device 100 through communication may be limited to a set or specific number. When the number of the plurality of second electronic devices 200 is increased, the likelihood of errors may be increased in a communication connection between the first electronic device 100 and the plurality of second electronic devices 200. The number of image signals received from the plurality of second electronic devices 200 may be greater than the number of the display regions (e.g., the first display region AA1 and the second display region AA2). All of a plurality of image signals may not be displayed in the plurality of display regions (e.g., the first display region AA1 and the second display region AA2). Thus, the number of the plurality of second electronic devices 200 capable of being coupled to the first electronic device 100 through communication may be limited to a set or specific number, for example, a number less than or equal to the number of the plurality of display regions (e.g., the first display region AA1 and the second display region AA2) of the first electronic device 100. When the display unit 120 of the first electronic device 100 includes three display regions, the number of the plurality of second electronic devices 200 may be less than or equal to three. In this case, all of a plurality of image signals received from the plurality of second electronic devices 200 may be displayed in the plurality of display regions (e.g., the first display region AA1 and the second display region AA2).

Figure 6A:
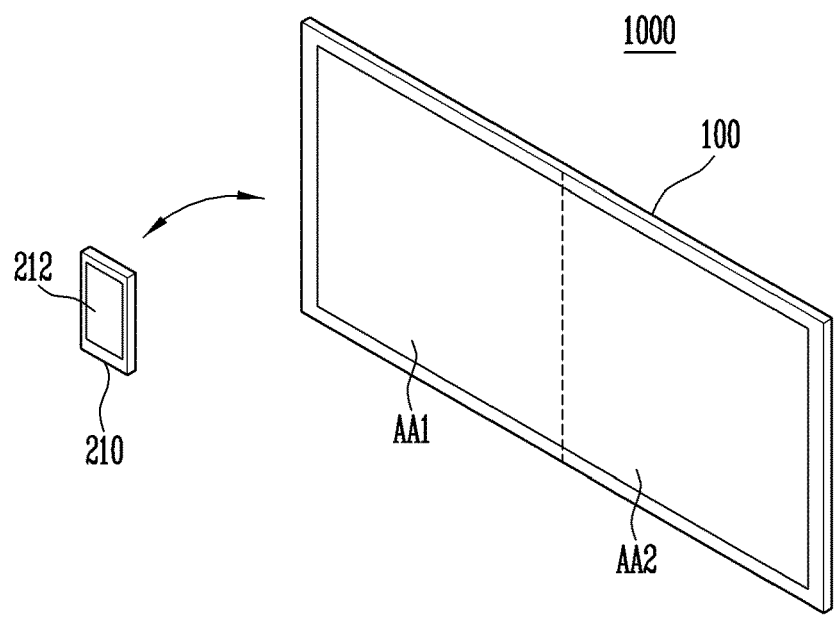
FIGS. 6A to 6C are diagrams illustrating a system of an electronic device according to an exemplary embodiment of the present disclosure.
Figure 6B:
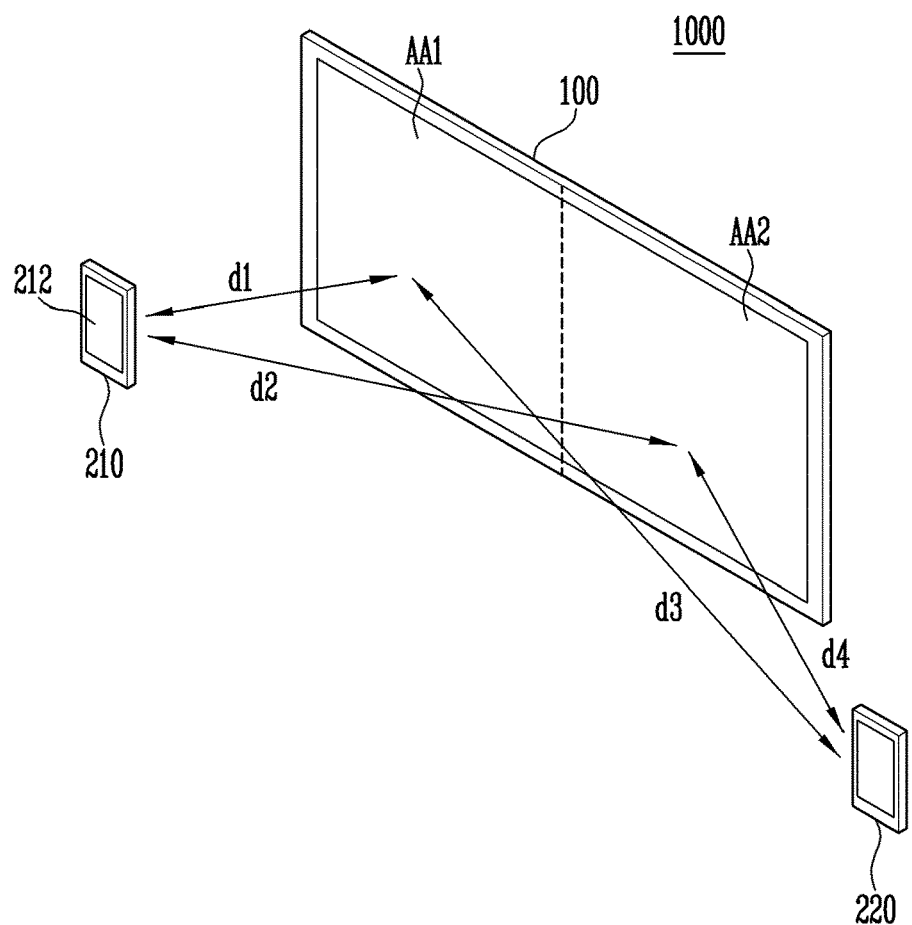

Next, a system operating method of an electronic device and a system 1000 of the electronic device, in which a first electronic device 100 and a (2-1)$^{th}$ electronic device 210 are coupled through communication, a (2-2)$^{th}$ electronic device is coupled to the first electronic device 100 by an approval of the (2-1)$^{th}$ electronic device, and thus, a plurality of image signals are transmitted to the first electronic device 100 from electronic devices 200 and are displayed a plurality of display regions (e.g., the first display region AA1 and the second display region AA2), will be described in more detail herein below with reference to FIGS. 5 to 6B.

Figure 6C:
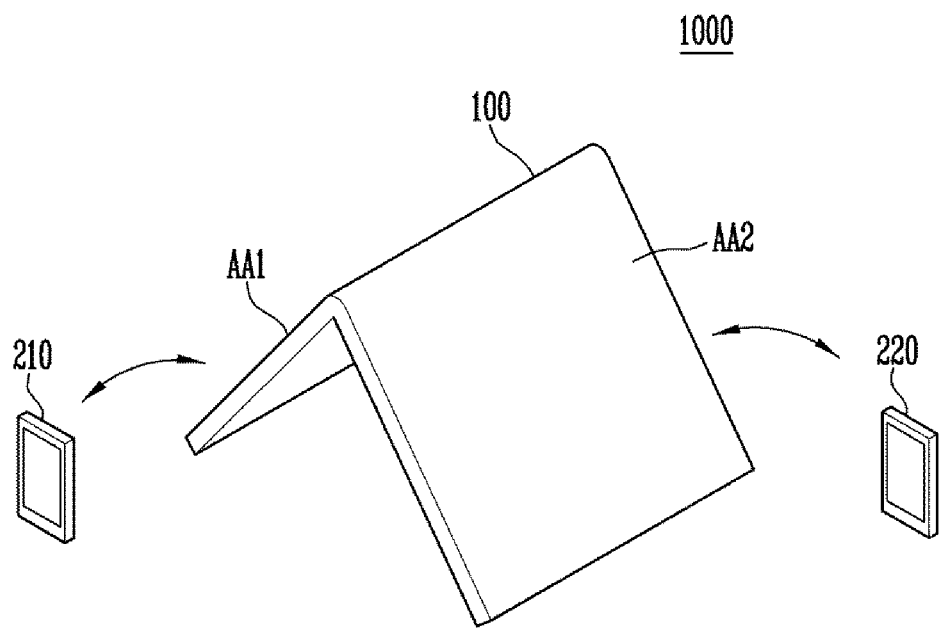

FIG. 5 is a flowchart of a system operating method of an electronic device according to an exemplary embodiment of the present disclosure. FIGS. 6A to 6C are diagrams illustrating a system of an electronic device according to an exemplary embodiment of the present disclosure.

Referring to FIGS. 5 and 6A, first, a $(2\text{-}1)^{th}$ electronic device 210 performs a communication connection with a first electronic device 100 (S110). The $(2\text{-}1)^{th}$ electronic device 210 may enter a surrounding space of the first electronic device 100, in which the $(2\text{-}1)^{th}$ electronic device 210 is capable of communicating with the first electronic device 100, and the first electronic device 100 may receive a communication connection request from the $(2\text{-}1)^{th}$ electronic device 210. The first electronic device 100 may be coupled to the $(2\text{-}1)^{th}$ electronic device 210 through communication in response to the reception of the connection request. The $(2\text{-}1)^{th}$ electronic device 210 may be in a state in which the $(2\text{-}1)^{th}$ electronic device 210 is capable of transmitting an image signal to the first electronic device 100.

Next, a $(2\text{-}2)^{th}$ electronic device 220 transmits a connection request signal with respect to the first electronic device 100 to the first electronic device 100 (S120). The $(2\text{-}2)^{th}$ electronic device 220 may enter a surrounding space of the first electronic device 100, in which the $(2\text{-}2)^{th}$ electronic device 220 is capable of communicating with the first electronic device 100, and the first electronic device 100 may receive the connection request signal from the $(2\text{-}2)^{th}$ electronic device 210.

Then, the first electronic device 100 transmits a connection approval request signal to the $(2\text{-}1)^{th}$ electronic device 210 (S130). Unlike the $(2\text{-}1)^{th}$ electronic device 210, the $(2\text{-}2)^{th}$ electronic device 220 may be coupled by a connection approval of the $(2\text{-}1)^{th}$ electronic device 210. In some embodiments, the $(2\text{-}1)^{th}$ electronic device 210 may have an approval right to approve another second electronic device to be coupled to the first electronic device 100 through communication. An approval right for a communication connection may be granted to the second electronic device 200 which is first coupled to the first electronic device 100 through communication. Alternatively, the approval right may also be set by a user. However, the present disclosure is not limited thereto. As described above, the first electronic device 100 may transmit a connection approval request for a communication connection between the $(2\text{-}2)^{th}$ electronic device and the first electronic device 100 to the $(2\text{-}1)^{th}$ electronic device 210 having the approval right for the communication connection.

The $(2\text{-}1)^{th}$ electronic device 210 transmits a connection approval signal to the first electronic device 100 (S140). The $(2\text{-}1)^{th}$ electronic device 210 may determine whether to approve a communication connection between the $(2\text{-}2)^{th}$ electronic device 220 and the first electronic device 100.

For example, a notification window asking to approve the communication connection of the $(2\text{-}2)^{th}$ electronic device 220 may be displayed on a display unit 212 of the $(2\text{-}1)^{th}$ electronic device 210. A user of the $(2\text{-}1)^{th}$ electronic device 210 may select whether to approve the connection of the $(2\text{-}2)^{th}$ electronic device 220.

In another example, the $(2\text{-}1)^{th}$ electronic device 210 may determine whether to approve the connection of the $(2\text{-}2)^{th}$ electronic device 220 by checking whether the number of the second electronic devices 200 coupled to the first electronic device 100 through communication exceeds a set or specific number. As described above, the number of the second electronic devices 200 capable of being coupled to the first electronic device 100 through communication may be set to the specific number such as, for example, two, which is the number of the plurality of display regions (e.g., the first display region AA1 and the second display region AA2). The $(2\text{-}1)^{th}$ electronic device 210 may receive data on the number of the second electronic devices 200 coupled to the first electronic device 100 through communication from the first electronic device 100. When the second electronic device 200 coupled to the first electronic device 100 through communication is one $(2\text{-}1)^{th}$ electronic device 210, the $(2\text{-}1)^{th}$ electronic device 210 may determine that the number of the second electronic devices 200 coupled to the first electronic device 100 through communication is less than a preset specific number and may transmit a connection approval signal for approving the communication connection of the $(2\text{-}2)^{th}$ electronic device 220 to the first electronic device 100.

However, a condition of a case in which the $(2\text{-}1)^{th}$ electronic device 210 transmits the connection approval signal is not limited thereto, and the connection approval signal may be transmitted according to various suitable conditions.

Then, the first electronic device 100 performs a communication connection with the $(2\text{-}2)^{th}$ electronic device 220 (S150). The first electronic device 100 performs the communication connection with the $(2\text{-}2)^{th}$ electronic device 220 in response to the connection approval signal received from the $(2\text{-}1)^{th}$ electronic device 210.

Next, the first electronic device 100 receives a first image signal from the $(2\text{-}1)^{th}$ electronic device 210 and receives a second image signal from the $(2\text{-}2)^{th}$ electronic device 220 (S160). The first image signal may be an image signal generated by the $(2\text{-}1)^{th}$ electronic device 210, and the second image signal may be an image signal generated by the $(2\text{-}2)^{th}$ electronic device 220. The first electronic device 100 may receive the first image signal and the second image signal from the $(2\text{-}1)^{th}$ electronic device 210 and the $(2\text{-}2)^{th}$ electronic device 220 coupled thereto through communication, respectively.

The first electronic device 100 displays the first image signal in the first display region AA1 as an image and displays the second image signal in the second display region AA2 as an image (S170). The first electronic device 100 respectively displays the first image signal and the second image signal in the first display region AA1 and the second display region AA2 based on pieces of distance data on respective distances between the plurality of second electronic devices 200 and the plurality of display regions (e.g., the first display region AA1 and the second display region AA2).

In some embodiments, a sensing unit 140 of the first electronic device 100 or a sensing unit of each of the second electronic devices 200 (e.g., the $(2\text{-}1)^{th}$ electronic device 210 and the $(2\text{-}2)^{th}$ electronic device 220) measures a respective distance between each of the second electronic devices 200 (e.g., the $(2\text{-}1)^{th}$ electronic device 210 and the $(2\text{-}2)^{th}$ electronic device 220) and each of the plurality of display regions (e.g., the first display region AA1 and the second display region AA2).

When the first electronic device 100 includes the sensing unit 140, antennas in the display regions (e.g., the first display region AA1 and the second display region AA2) may generate wireless signals to the second electronic devices 200 (e.g., the $(2\text{-}1)^{th}$ electronic device 210 and the $(2\text{-}2)^{th}$ electronic device 220) and may receive response signals from the second electronic devices 200 (e.g., the $(2\text{-}1)^{th}$ electronic device 210 and the $(2\text{-}2)^{th}$ electronic device 220) in response to the wireless signals. A communication unit 110 may transmit generation times of the wireless signals and reception times of the response signals to the sensing unit 140. The sensing unit 140 may measure respective distances between the second electronic devices 200 (e.g., the $(2\text{-}1)^{th}$ electronic device 210 and the $(2\text{-}2)^{th}$ electronic device 220) and the display regions (e.g., the first display region AA1 and the second display region AA2) based on the generation times and the reception times.

In some embodiments, when each of the second electronic devices 200 (e.g., the $(2-1)^{th}$ electronic device 210 and the $(2-2)^{th}$ electronic device 220) includes the sensing unit, for example, the antennas in the display regions (e.g., the first display region AA1 and the second display region AA2) of the first electronic device 100 may transmit response signals in response to a wireless signal generated by a communication unit 211 of the $(2-1)^{th}$ electronic device 210, and the communication unit 211 of the $(2-1)^{th}$ electronic device 210 may receive the response signals. The communication unit 211 of the $(2-1)^{th}$ electronic device 210 may transmit data on a transmission time of the wireless signal and pieces of data on reception times of the response signals from the sensing unit 214. The sensing unit 214 may measure a relative distance between the $(2-1)^{th}$ electronic device 210 and each of the display regions (e.g., the first display region AA1 and the second display region AA2), respectively, based on a time difference between the transmission time of the wireless signal and each of the reception times of the response signals. Distance data measured by the sensing unit 214 of the $(2-1)^{th}$ electronic device 210 may be transmitted to the first electronic device 100. A distance measuring method of the $(2-2)^{th}$ electronic device 220 may be the same as a distance measuring method of the $(2-1)^{th}$ electronic device 210.

Through Referring to FIG. 6B, through the distance measuring method, the sensing unit 140 of the first electronic device 100 or the sensing unit 214 of the $(2-1)^{th}$ electronic device 210 may determine that a first distance d1 between the $(2-1)^{th}$ electronic device 210 and the first display region AA1 is less than a second distance d2 between the $(2-1)^{th}$ electronic device 210 and the second display region AA2. The sensing unit 140 of the first electronic device 100 or the sensing unit 214 of the $(2-2)^{th}$ electronic device 220 may determine that a third distance d3 between the $(2-2)^{th}$ electronic device 220 and the first display region AA1 is greater than a fourth distance d4 between the $(2-2)^{th}$ electronic device 220 and the second display region AA2.

The first electronic device 100 may determine the display regions (e.g., the first display region AA1 and the second display region AA2), in which the first image signal and the second image signal are displayed as images, using pieces of distance data on the first distance d1, the second distance d2, the third distance d3, and the fourth distance d4. A controller 130 of the first electronic device 100 may determine whether each image signal is displayed in any of the display regions (e.g., the first display region AA1 and the second display region AA2) using the distance data on the first distance d1 between the $(2-1)^{th}$ electronic device 210 and the first display region AA1, the distance data on the second distance d2 between the $(2-1)^{th}$ electronic device 210 and the second display region AA2, the distance data on the third distance d3 between the $(2-2)^{th}$ electronic device 220 and the first display region AA1, and the distance data on the fourth distance d4 between the $(2-2)^{th}$ electronic device 220 and the second display region AA2. For example, when the first distance d1 is less than the second distance d2, it may be determined that the $(2-1)^{th}$ electronic device 210 is located closer to the first display region AA1, and it may be determined that the first image signal is displayed as the image in the first display region AA1. When the third distance d3 is greater than the fourth distance d4, it may be determined that the $(2-2)^{th}$ electronic device 220 is located closer to the second display region AA2, and it may be determined that the second image signal is displayed as the image in the second display region AA2. The controller 130 of the first electronic device 100 may control a display unit 120 to display the first image signal of the $(2-1)^{th}$ electronic device 210 in the first display region AA1 as the image and display the second image signal of the $(2-2)^{th}$ electronic device 220 in the second display region AA2 as the image.

Referring to FIG. 6C, as described above, the first electronic device 100 may be in-folded or out-folded at a boundary between the first display region AA1 and the second display region AA2. For example, as shown in FIG. 6C, the first electronic device 100 may be out-folded at a certain angle such that the first display region AA1 faces the $(2-1)^{th}$ electronic device 210 and the second display region AA2 faces the $(2-2)^{th}$ electronic device 220. The first electronic device 100 may be erected in an out-folded state such that a folded portion thereof is located at an upper side thereof according to user convenience. A user using the $(2-1)^{th}$ electronic device 210 looks at the first display region AA1 and a user using the $(2-2)^{th}$ electronic device 220 looks at the second display region AA2 so that the users look at each other.

The users may perform various suitable activities utilizing the system 1000 of the electronic device. For example, the users may play a game using the $(2-1)^{th}$ electronic device 210, the $(2-2)^{th}$ electronic device 220, and the first electronic device 100. The $(2-1)^{th}$ electronic device 210 and the $(2-2)^{th}$ electronic device 220 may be used as devices for controlling the game, and the first electronic device 100 may display different images in the first display region AA1 and the second display region AA2 such that the game is proceeded. However, the present disclosure is not limited thereto, and the first electronic device 100 may be arranged differently, and the users may perform various suitable activities utilizing the system 1000 of the electronic device.

In various exemplary embodiments, the first electronic device 100 may receive distance data from the $(2-1)^{th}$ electronic device 210 and the $(2-2)^{th}$ electronic device 220 at a certain period. The first electronic device 100 may change a display region in which the first image signal and the second image signal are displayed as images in response to a change in distance data. For example, the $(2-1)^{th}$ electronic device 210 may be moved closer to the second display region AA2 than to the first display region AA1, and the $(2-)^{th}$ electronic device 220 may be moved closer to the first display region AA1 than to the second display region AA2. The first electronic device 100 may receive changed distance data, and the controller 130 may control the display unit 120 to display the first image signal in the second display region AA2 as an image and display the second image signal in the first display region AA1 as an image. Accordingly, the display unit 120 may display the second image signal in the first display region AA1 as the image and display the first image signal in the second display region AA2 as the image.

In addition, in various exemplary embodiments, the first electronic device 100 may continuously receive distance data from the $(2-1)^{th}$ electronic device 210 and the $(2-2)^{th}$ electronic device 220. The first image signal and the second image signal may be displayed as enlarged or reduced images in response to a change in distance data. For example, when a distance between the $(2-1)^{th}$ electronic device 210 and the first electronic device 100 is decreased, the controller 130 of the first electronic device 100 may control the display unit 120 to display the first image signal received from the $(2-1)^{th}$ electronic device 210 in the first display region AA1 as a zoom-in image. In this case, the user of the $(2-1)^{th}$ electronic device 210 may view an image of the first image signal as a further enlarged image so that the user may feel a perspective as if an object of an image approaches. When the distance between the $(2-1)^{th}$ electronic device 210 and the first electronic device 100 is increased again, the controller 130 of the first electronic device 100 may control the display unit 120 to display the first image signal in the first display region AA1 as a zoom-out image. In this case, the user of the $(2-1)^{th}$ electronic device 210 may view an image of the first image signal as a reduced image so that the user may feel a perspective as if an object of an image recedes. The first electronic device 100 is not limited to displaying an image signal as an enlarged or reduced image. For example, when a distance between the first electronic device 100 and the second electronic device 200 is decreased, a further reduced image may be displayed, and when the distance is increased, a further enlarged image may be displayed.

In the case of the first electronic device 100 and the second electronic devices 200, the system 1000 of the electronic device, and the system operating method of the electronic device according to the exemplary embodiment of the present disclosure, the plurality of second electronic devices 200 may transmit image signals to the first electronic device 100, and the image signals may be displayed as images in one of the display regions based the respective distances between the second electronic devices 200 and the plurality of display regions (e.g., the first display region AA1 and the second display region AA2). In this case, the image signal transmitted by the set or specific electronic device of the second electronic devices 200 may be displayed as an image in a display region which is closest to a corresponding electronic device of the second electronic devices 200 among the plurality of display regions (e.g., the first display region AA1 and the second display region AA2). Thus, when a plurality of users each use the second electronic device 200, each user may view an image signal transmitted to the first electronic device 100 from the second electronic device 200 used by the user as an image in a display region which is closest to the second electronic device 200. Accordingly, the users may view an image through the wider display regions (e.g., the first display region AA1 and the second display region AA2) of the first electronic device 100.

In the case of the first electronic device 100 and the second electronic devices 200, the system 1000 of the electronic device, and the system operating method of the electronic device according to the exemplary embodiment of the present disclosure, when a relative position relationship between each of the plurality of second electronic devices 200 and each of the plurality of display regions (e.g., the first display region AA1 and the second display region AA2) is changed, a display region in which a plurality of image signals are displayed may be fluidly changed in response to the change. When the user using the $(2-1)^{th}$ electronic device 210 changes a position of the $(2-1)^{th}$ electronic device 210 from a position closer to the first display region AA1 to a position closer to the second display region AA2, the first image signal of the $(2-1)^{th}$ electronic device 210 may be displayed as an image in the second display region AA2 rather than the first display region AA1. Accordingly, a display region in which an image is displayed may be changed in response to the change in the relative position relationship between the second electronic device 200 and each of the plurality of display regions (e.g., the first display region AA1 and the second display region AA2), thereby further improving user convenience.

In addition, in the case of the first electronic device 100 and the second electronic devices 200, the system 1000 of the electronic device, and the system operating method of the electronic device according to the exemplary embodiment of the present disclosure, only when the $(2-1)^{th}$ electronic device 210 having an approval right to approve a communication connection between another second electronic device 200 and the first electronic device 100 approves the communication connection, the $(2-2)^{th}$ electronic device 220 may be coupled to the first electronic device 100 through communication. Thus, when another second electronic device 200 is adjacent to the first electronic device 100, a likelihood or degree of unconditional connection between the $(2-2)^{th}$ electronic device 220 and the first electronic device 100 may be prevented or reduced. The $(2-2)^{th}$ electronic device 220 may be coupled to the first electronic device 100 only by an approval of the user of the $(2-1)^{th}$ electronic device 210 or an approval under a set or specific condition.

Figure 7A:
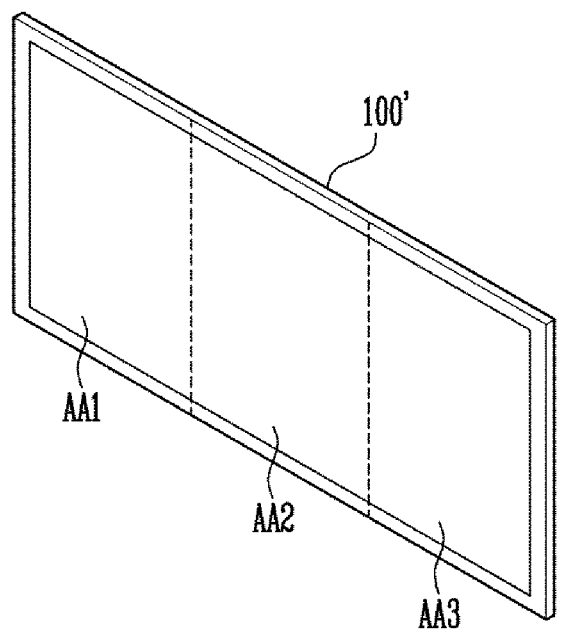
FIGS. 7A and 7B are diagrams illustrating an electronic device and a system of the electronic device according to another exemplary embodiment of the present disclosure.
Figure 7B:
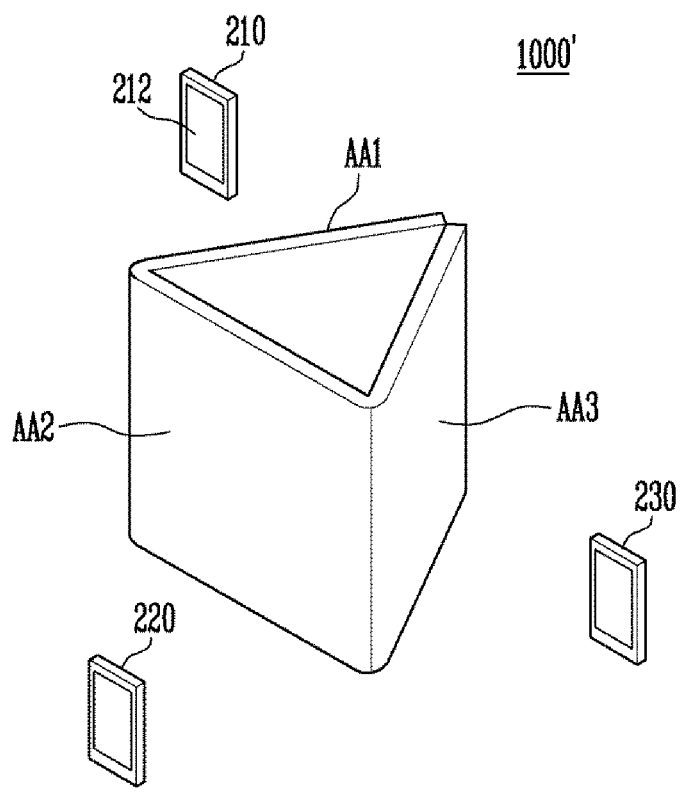

FIGS. 7A and 7B are diagrams illustrating an electronic device and a system of the electronic device according to another exemplary embodiment of the present disclosure. An electronic device and a system 1000' of FIGS. 7A and 7B are substantially the same as the electronic device and the system 1000 of the electronic device of FIGS. 1 to 6C, except that a first electronic device 100' and a plurality of second electronic devices 200' are different from those of FIGS. 1 to 6C, and redundant descriptions thereof will be omitted.

Referring to FIGS. 7A and 7B, a display unit 120 of the first electronic device 100' includes a first display region AA1, a second display region AA2, and a third display region AA3. The first display region AA1 and the third display region AA3 are side by side adjacent to the second display region AA2. The first display region AA1 is adjacent to the second display region AA2, the third display region AA3 is adjacent to the second display region AA2, and the first display region AA1 and the third display region AA3 are located with the second display region AA2 in-between.

The first electronic device 100' may be folded according to an in-folding method or an out-folding method between the first display region AA1 and the second display region AA2 and between the second display region AA2 and the third display region AA3. The first electronic device 100' may be in-folded such that the first display region AA1 and the second display region AA2 face each other or be out-folded such that the first display region AA1 and the second display region face in different directions between the first display region AA1 and the second display region AA2. The first electronic device 100' may be in-folded such that the second display region AA2 and the third display region AA3 face each other or be out-folded such that the second display region AA2 and the third display region AA3 face in different directions between the second display region AA2 and the third display region AA3. For example, as shown in FIG. 7B, the first electronic device 100' may be out-folded between the display region AA1 and the display region AA2 and between the second display region AA2 and the display region AA3. The first electronic device 100 may be located such that an end of the first display region AA1 and an end of the third display region AA3 come into contact with each other.

The plurality of second electronic devices 200' may include three electronic devices, e.g., the $(2-1)^{th}$ electronic device 210, the $(2-2)^{th}$ electronic device 220, and the $(2-3)^{th}$ electronic device 230. Each of the $(2-1)^{th}$ electronic device 210, the $(2-2)^{th}$ electronic device 220, and the $(2-3)^{th}$ electronic device 230 may be coupled to the first electronic device 100' through communication. The $(2-1)^{th}$ electronic device 210, the $(2-2)^{th}$ electronic device 220, and the $(2-3)^{th}$ electronic device 230 may respectively transmit a first image signal, a second image signal, and a third image signal to the first electronic device 100'. Each second electronic device 200' or the first electronic device 100' may measure respective distances between the $(2-1)^{th}$ electronic device 210, the $(2-2)^{th}$ electronic device 220, and the $(2-3)^{th}$ electronic device 230 and the first display region AA1, the second display region AA2, and the third display region AA3. For example, the $(2-1)^{th}$ electronic device 210 may be closest to the first display region AA1, the $(2-2)^{th}$ electronic device 220 may be closest to the second display region AA2, and the $(2-3)^{th}$ electronic device 230 may be closest to the third display region AA3. Accordingly, a controller 130 of the first electronic device 100' may control a display unit 120 to display the first image signal received from the $(2-1)^{th}$ electronic device 210 in the first display region AA1 as an image, display the second image signal received from the $(2-2)^{th}$ electronic device 220 in the second display region AA2 as an image, and display the third image signal received from the $(2-3)^{th}$ electronic device 230 in the third display region AA3 as an image.

In the case of the first electronic device 100' and the second electronic devices 200', the system 1000' of the electronic device, and a system operating method of the electronic device according to another exemplary embodiment of the present disclosure, the display unit 120 of the first electronic device 100' may include two or more display regions, for example, three display regions. The plurality of second electronic devices 200' may include three second electronic devices (e.g., the $(2-1)^{th}$ electronic device 210, the $(2-2)^{th}$ electronic device 220, and the $(2-3)^{th}$ electronic device 230). An image signal may be displayed as an image in a display region closest to the second electronic device 200' based on distance data on a respective distance between each of the second electronic devices (e.g., the $(2-1)^{th}$ electronic device 210, the $(2-2)^{th}$ electronic device 220, and the $(2-3)^{th}$ electronic device 230) and the plurality of display regions (e.g., the first display region AA1, the second display region AA2, and the third display region AA3).

Figure 8:
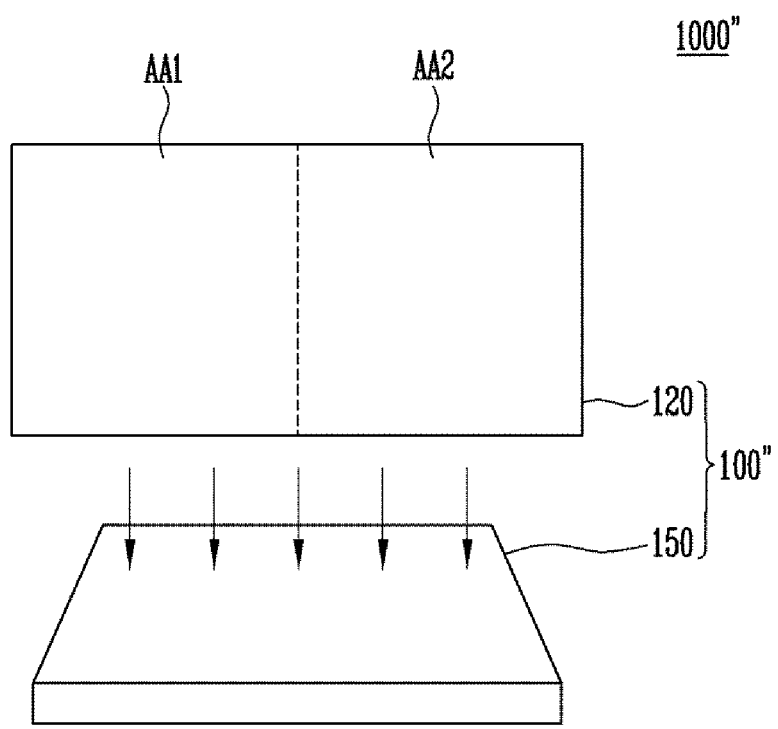
FIG. 8 is a diagram illustrating a first electronic device according to another exemplary embodiment of the present disclosure.

FIG. 8 is a diagram illustrating a first electronic device according to another exemplary embodiment of the present disclosure. A first electronic device 100" of FIG. 8 is substantially the same as the first electronic device 100 and the second electronic devices 200 and the system 1000 of the electronic device of FIGS. 1 to 6C, except that the first electronic device 100" is different from that of FIGS. 1 to 6C, and redundant descriptions thereof will not be repeated here.

Referring to FIG. 8, the first electronic device 100" may be divided into a display unit 120 and a docking unit 150. In some embodiments, the first electronic device 100" may include a communication unit 110, a display unit 120, a controller 130, a sensing unit 140, and a power supply. Components except for the display unit 120 of the first electronic device 100", e.g., the communication unit 110, the controller 130, the sensing unit 140, and the power supply may be separated from the display unit 120 and may be included in the docking unit 150, which may be separate. The docking unit 150 and the display unit 120 may be separated or coupled. When the display unit 120 is separated from the docking unit 150, the display unit 120 may not receive power from the power supply and thus may not display an image. When the display unit 120 is coupled to the docking unit 150, power may be supplied to the display unit 120 from the power supply, and an image may be displayed in a display region.

In the case of the first electronic device 100", a system 1000" of the electronic device, and a system operating method of the electronic device according to another exemplary embodiment of the present disclosure, the display unit 120 of the first electronic device 100" may be separated and coupled from and to the docking unit 150. When the display unit 120 is separated from the docking unit 150, power supplying may be cut off and thus an image may not be displayed. When the display unit 120 is coupled to the docking unit 150, power may be supplied and thus an image may be displayed. The docking unit 150 of the first electronic device 100" may be fixedly located at a certain place (e.g., location), and the display unit 120 may be carried by a user. The display unit 120 may be small in size and light in weight as compared with the entirety of the first electronic device 100" so that portability of the display unit 120 is increased. In addition, when the display unit 120 is coupled to the docking unit 150, the first electronic device 100" may display an image.

According to embodiments of the present disclosure, a plurality of image signals received to a first electronic device from a plurality of second electronic devices may be displayed as images in a display region selected based a respective distance between each of the plurality of second electronic devices and each of a plurality of display regions.

According to embodiments of the present disclosure, a first electronic device may be folded according to at least one of an in-folding method and an out-folding method in a folding region provided between display regions so that users of a plurality of second electronic devices may effectively view the display region of the first electronic device at respective positions thereof.

Effects of embodiments of the present disclosure are not restricted to the exemplary embodiments set forth herein and more diverse effects are included in this description.

As used herein, the term "and/or" includes any and all combinations of one or more of the associated listed items. Expressions such as "at least one of," when preceding a list of elements, modify the entire list of elements and do not modify the individual elements of the list.

As used herein, the terms "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

Also, any numerical range recited herein is intended to include all subranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

Embodiments of the present disclosure have been described in connection with what is presently considered to be exemplary embodiments. Although the exemplary embodiments of the present disclosure have been described, the present disclosure may be also used in various other combinations, modifications and environments. For example, the subject matter of the present disclosure may be changed or modified within the range of concepts disclosed in the specification, the range of equivalents to the disclosure and/or the range of the technology or knowledge in the field to which the present disclosure pertains. Therefore, it is to be understood that the subject matter of the disclosure is not limited to the disclosed exemplary embodiments. It is to be understood that other embodiments are also included within the spirit and scope of the appended claims, and equivalents thereof.

What is claimed is:

1. An electronic device comprising:
    a communication unit configured to receive a plurality of image signals from a plurality of other electronic devices;
    a display unit comprising display regions comprising at least a first display region and a second display region; and
    a controller configured to control the display unit to display a first image signal received from a first other electronic device of the plurality of the other electronic devices in the first display region as an image and display a second image signal received from a second other electronic device of the plurality of other electronic devices in the second display region as an image,
    wherein the first display region and the second display region are determined according to respective distances between the plurality of other electronic devices and each of the display regions.

2. The electronic device of claim 1, wherein a distance between the first display region and the first other electronic device is less than a respective distance between each of the remaining display regions except for the first display region and the first other electronic device, and
    a distance between the second display region and the second other electronic device is less than a respective distance between each of the remaining display regions except for the second display region and the second other electronic device.

3. The electronic device of claim 1, wherein the communication unit is configured to receive distance data on a respective distance between the first other electronic device and each of the display regions from the first other electronic device and configured to receive distance data on a respective distance between the second other electronic device and each of the display regions from the second other electronic device.

4. The electronic device of claim 1, further comprising a sensing unit configured to measure a respective distance between each of the plurality of other electronic devices and each of the display regions.

5. The electronic device of claim 4, wherein the communication unit comprises antennas in the display regions, the antennas being configured to receive wireless signals from the plurality of other electronic devices, and
    the sensing unit is configured to measure the respective distance between each of the plurality of other electronic devices and each of the display regions based on the wireless signal received by each of the antennas.

6. The electronic device of claim 1, wherein the display unit is folded according to at least one selected from an in-folding method and an out-folding method at a boundary between the display regions.

7. The electronic device of claim 6, wherein the communication unit is configured to communicate with the plurality of other electronic devices in response to the folding of the display unit.

8. The electronic device of claim 6, wherein the electronic device is configured to be turned on or off in response to the folding of the display unit.

9. The electronic device of claim 1, wherein, when the communication unit receives the second image signal from the second other electronic device, the communication unit receives a connection request signal with respect to the electronic device from another other electronic device, transmits a connection approval request signal to the first other electronic device having an approval right in response to the connection request signal, and performs a communication connection with the another other electronic device only when the connection approval signal is received from the first other electronic device.

10. The electronic device of claim 1, wherein a number of the plurality of other electronic devices is a number equal to or less than a number of the display regions.

11. The electronic device of claim 1, further comprising a power supply configured to supply power to the electronic device,
    wherein at least one selected from the power supply and the controller is physically separable from other components of the electronic device.

12. The electronic device of claim 1, wherein the controller is configured to intactly supply the plurality of image signals received by the communication unit to the display unit, and
    the plurality of image signals are image data in which image processing is performed.

13. A system operating method of an electronic device, comprising:
    receiving, by an electronic device comprising display regions comprising at least a first display region and a second display region, a plurality of image signals from a plurality of other electronic devices;
    determining, by the electronic device, display regions in which a first image signal received from a first other electronic device of the plurality of other electronic devices and a second image signal received from a second other electronic device of the plurality of other electronic devices are displayed as images based on respective distances between the plurality of other electronic devices and each of the plurality of display regions; and
    displaying the first image signal in the first display region as the image and displaying the second image signal in the second display region as the image.

14. The system operating method of claim 13, wherein the determining of the display regions in which the first image signal and the second image signal are displayed as the images comprises determining a display region that is closest to one of the plurality of other electronic devices among the plurality of other electronic devices as to be a display region in which an image signal received from the one of the plurality of other electronic devices is displayed as an image.

15. The system operating method of claim 14, wherein a distance between the first display region and the first other electronic device is less than a respective distance between each of the remaining display regions except for the first display region and the first other electronic device, and a distance between the second display region and the second other electronic device is less than a respective distance between each of the remaining display regions except for the second display region and the second other electronic device.

16. The system operating method of claim 13, wherein the receiving of the plurality of image signals from the plurality of other electronic devices comprises receiving, by the electronic device, distance data on a respective distance between the first other electronic device and each of the display regions from the first other electronic device and distance data on a respective distance between the second other electronic device and each of the display regions from the second other electronic device.

17. The system operating method of claim 13, wherein the receiving of the plurality of image signals from the plurality of other electronic devices further comprises generating, by the electronic device, distance data by measuring a respective distance between each of the plurality of other electronic devices and each of the display regions based on each of wireless signals received by each of antennas by using the antennas in the display regions and receiving the wireless signals from the plurality of other electronic devices.

18. The system operating method of claim 13, further comprising, prior to receiving, by the electronic device, the plurality of image signals from the plurality of other electronic devices, performing, by the electronic device, a communication connection with the first other electronic device in response to a folding operation between display regions, receiving, by the electronic device, a connection request signal from the second other electronic device, transmitting, by the electronic device, a connection approval request signal to the first other electronic device having an approval right in response to a reception of the connection request signal, and when the connection approval signal is received from the first other electronic device, performing, by the electronic device, a communication connection with the second other electronic device.

19. A system of an electronic device, comprising:

a first electronic device comprising display regions which have at least a first display region and a second display region; and a plurality of second electronic devices communicating with the first electronic device, wherein a $(2-1)^{th}$ electronic device of the plurality of second electronic devices is configured to transmit a first image signal to the first electronic device, a $(2-2)^{th}$ electronic device of the plurality of second electronic devices is configured to transmit a second image signal to the first electronic device, the first electronic device is configured to display the first image signal in the first display region as an image and the second image signal in the second display region as an image, and the first display region and the second display region are determined based on respective distances between each of the $(2-1)^{th}$ electronic device and the $(2-2)^{th}$ electronic device and each of the display regions.

* * * * *